(No Model.)  
4 Sheets—Sheet 1.
J. T. GOODFELLOW.
IRON CAR.
No. 308,034. Patented Nov. 11, 1884.
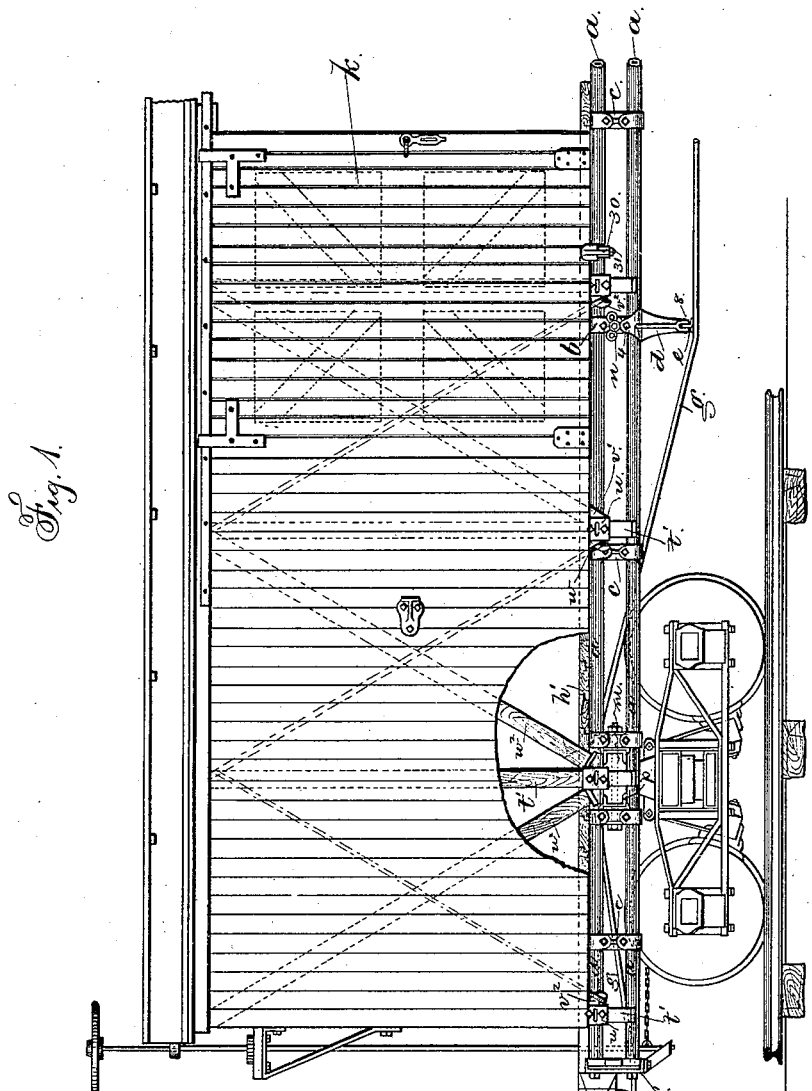
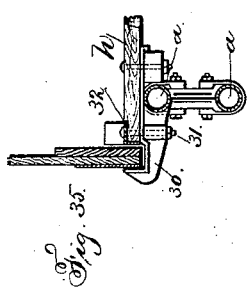
Witnesses  
Harold Serrell  
Chas H. Smith
Inventor  
James T. Goodfellow  
per Lemuel W. Serrell  
Atty (No Model.)
4 Sheets—Sheet 2.
J. T. GOODFELLOW.
IRON CAR.
No. 308,034. Patented Nov. 11, 1884.
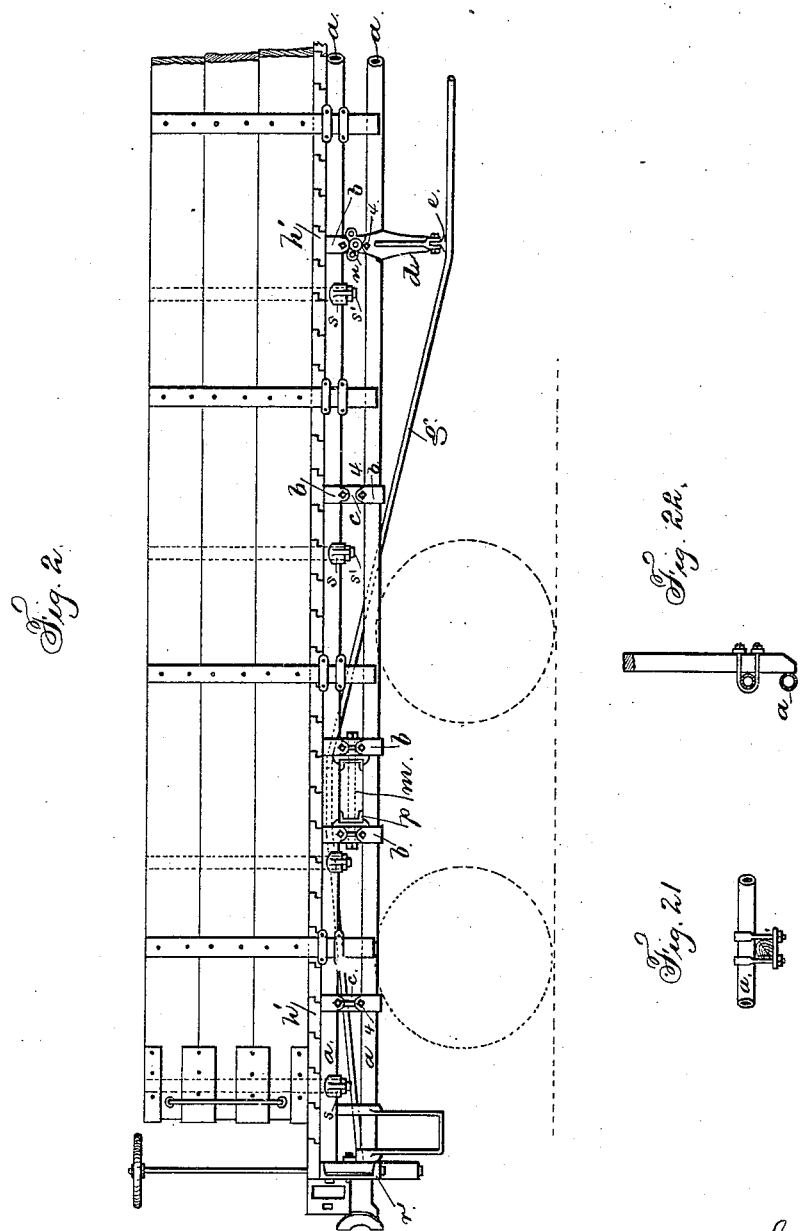

(No Model.) 4 Sheets—Sheet 3.
J. T. GOODFELLOW.
IRON CAR.
No. 308,034. Patented Nov. 11, 1884.
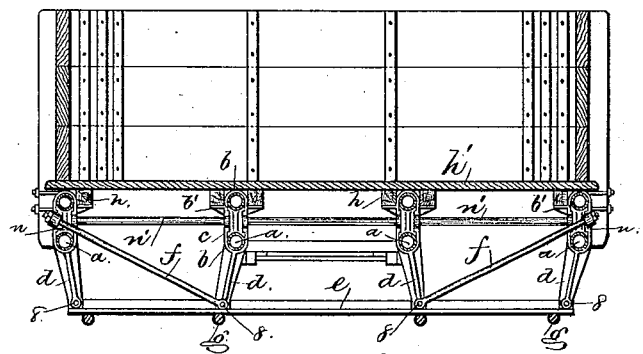
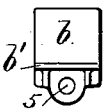 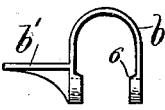 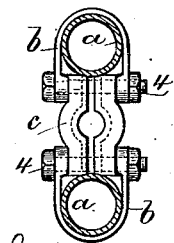 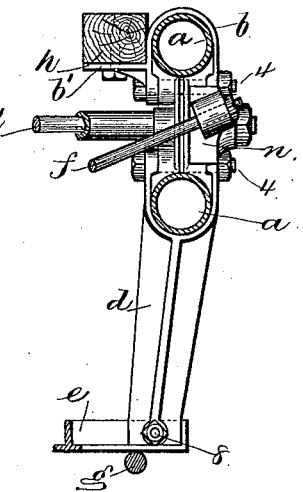
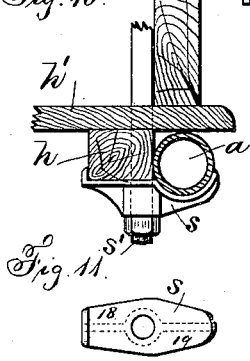
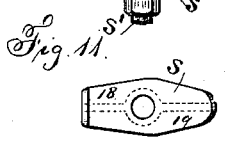
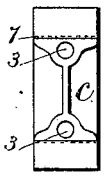 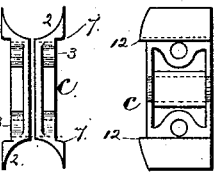  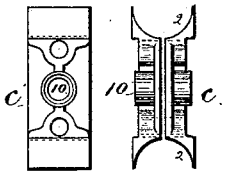
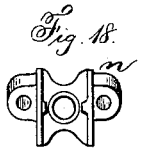  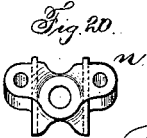
Witnesses
Harold Serrell
Chas H Smith
Inventor
James T Goodfellow
per Lemuel W Serrell atty (No Model.) 4 Sheets—Sheet 4.
J. T. GOODFELLOW.
IRON CAR.
No. 308,034. Patented Nov. 11, 1884.
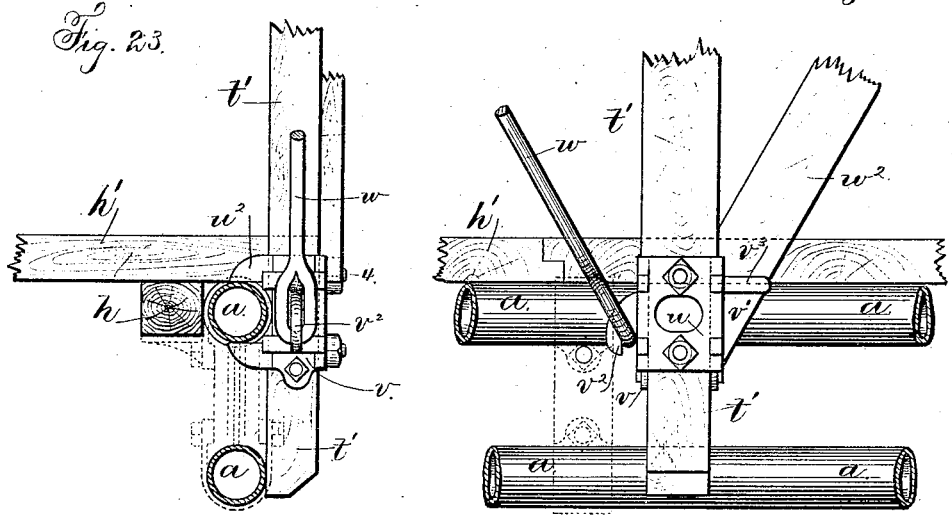
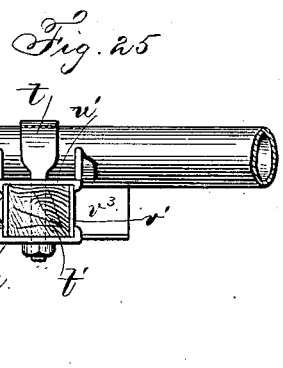
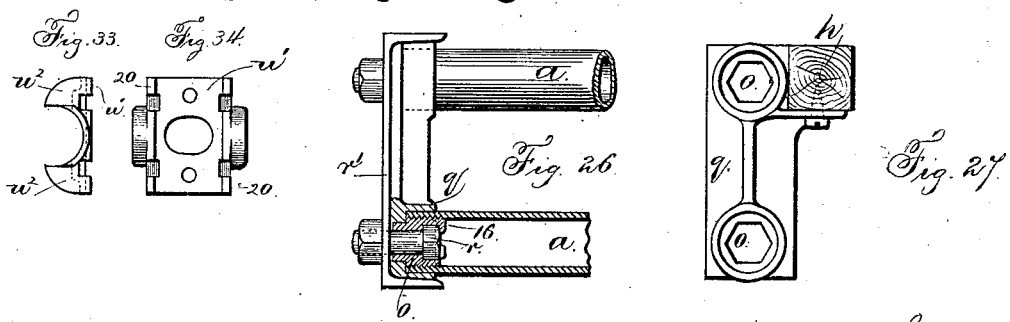
Witnesses
Harold Serrell
Chas H. Smith
Inventor
James T. Goodfellow
per Lemuel W. Serrell
atty.

UNITED STATES PATENT OFFICE.

JAMES THORN GOODFELLOW, OF TROY, ASSIGNOR TO ROBERT M. CUSHMAN, OF NEW YORK, N. Y.

IRON CAR.

SPECIFICATION forming part of Letters Patent No. 308,034, dated November 11, 1884.

Application filed March 10, 1884. (No model.)

*To all whom it may concern:*

Be it known that I, JAMES T. GOODFELLOW, of Troy, in the county of Rensselaer and State of New York, have invented an Improvement in Iron Cars, of which the following is a specification.

This invention relates to the details in the construction of the platform-frame that is composed principally of tubes. In the Patent No. 243,430, granted to W. A. Cushman, tubes are represented as composing the principal portions of the platform-frame. I do not claim the same.

In the drawings, Figure 1 is an elevation, partially in section, of a freight-car with my improvements. Fig. 2 is a partial side view of a gondola-car with the improved platform. Fig. 3 is a cross-section of the same. Figs. 4 to 35 represent the separate parts and details of construction.

The longitudinal tubes $a\ a$ are employed in pairs, one above the other; or they may be more numerous. They are connected together at suitable intervals and firmly held by clip-pieces and bearing-blocks. The clip-pieces $b$ are shown edgewise in Fig. 5 and sidewise in Fig. 4. The bearing-blocks $c$ are shown edgewise in Figs. 13, 15, and 17, and sidewise in Figs. 12, 14, and 16. Each bearing-block has a quarter-circle recess, 2, at each of its ends, and holes 3 transversely through it. These bearing-blocks are placed between the tubes $a\ a$, as seen in Fig. 8, and the clip-pieces $b$ set over the tube, and the bolts 4 pass through the holes 5 in the clip-pieces $b$, and through the holes 3 in the bearing-blocks $c$, so that by tightening upon the bolts 4 the tubes are clamped very firmly between the clips and bearing-blocks, and these bolts can be drawn up from time to time, if necessary, because the bearing-blocks do not touch each other in the middle, where they set back to back. The clips $b$ have bearing ledges or lips at 6, which interlock with similar ledges, 7, upon the bearing-blocks $c$, so that the strain in clamping the tubes $a$ does not come laterally against the bolts 4, but is taken upon said shoulders 6 and 7. It is to be understood that these bearing-blocks and clips are to be applied to all the longitudinal ranges of tubes $a$ at the required distances apart, so as to connect them firmly.

I have represented four ranges of longitudinal pipes—two in each range. There are longitudinal sill-pieces $h$ at the sides of the tubes $a\ a$, (see Figs. 3, 9, and 23,) for the reception of the flooring $h'$, and to support these sill-pieces I provide brackets $b'$, extending out horizontally from one or both sides of the upper clip-pieces $b$, upon which such sill-pieces rest, and to which they are bolted or otherwise secured. These brackets are not required upon those clips that are applied below the lower tube, $a$; but upon those lower clip-pieces which are near the middle part of the car there are struts $d$, extending downwardly, and ribbed to obtain the required strength. These struts are made in one with the clip-pieces, and they receive at their lower ends the connecting-bars and longitudinal bolts that form truss-braces to the car-platform. I prefer to cast, at the lower ends of these struts, jaws for the reception of the inverted-T-shaped tie-bars $e$, the parts being bolted together at 8. The longitudinal truss-bolts $g$ pass down beneath the tie-bars $e$, and up over the transom-beams $m$, and through the end plates of the car-platform. The longitudinal truss-bolts $g$ occupy vertical planes, and they lie upon the transom-beam $m$ at the inner sides of the upper tubes, $a$, and I preferably incline the struts $d$, as shown, so that their lower ends are above such truss-bolts, to receive the strain and form direct struts or braces between the lower tubes and the truss-bolts. The struts and tie-bars are braced by the bolts $f$, the lower ends of which are provided with eyes for the bolts 8 to pass through, and the upper ends are screw-threaded, and pass through holes in the saddles $n$, which are placed outside the bearing-blocks $c$ at the places where the struts $d$ are applied, and the nuts on the ends of the braces $f$ clamp the parts firmly. The bearing-blocks $c$ at these saddles $n$ have through them transverse holes 10, as seen in Figs. 16 and 17, and through these holes passes a bolt, $n'$, that goes across from one side of the car to the other, and also through the central holes of the saddles $n$, and there are tube-sections around the bolt $n'$, between one pair of bearing-blocks and the next, so as to firmly connect the bearing-blocks. The clips $c$, bearing-blocks, struts, bars e, braces f, and bolts n', compose a rigid transverse truss that connects the longitudinal tubes and supports the frame-work by resting upon the longitudinal truss-bolts. There will usually be two such transverse trusses near the middle portion of the car-platform if the platform is long, but with short cars only one such transverse truss will be required.

In constructing the transom-beam I make use of bearing-blocks c, that are provided with lips 12, as seen in Figs. 14 and 15, to extend above and below the edges of the transom-beam. Usually I employ bars or plates of iron p, which are at each side of and partially inclose the wooden transom-beam m. These bearing-blocks c are provided with half-circle recesses in their inner faces, as seen at 14 in Fig. 15, for the passage of a bolt running parallel with the tubes a, and passing through the bearing-blocks and the wood or iron transom-beam to screw the same firmly in place.

At the ends of the tubes a there are thimbles o, that are screwed into the internal thread of the pipes. Each thimble has a polygonal head, as seen in Fig. 27, for a wrench, by which it is screwed into the tube, and this head is received into a corresponding opening or recess in the end socket, q, so that it cannot turn while the bolt r is being screwed up. The end sockets, q, are each adapted to receive the ends of the longitudinal tubes a a, also the polygonal ends of the thimbles o, and the exterior form of these end sockets at top, bottom, and one side corresponds to the interior of the end sill, r', which is formed of angle-iron with holes that are in line with the bolts r. The thimbles o might be screw-threaded on their inner surfaces for tap-bolts; but usually they are of malleable cast-iron, and each made with a hole through it, and with a recess for the reception of the head of the bolt, and with projecting fingers 16, that are bent down over the head after the bolt has been inserted into place, so as to prevent the bolt being pushed into the tube. The nut of the bolt in this case comes outside the end sill, r'.

It is to be understood that a bolt is to be inserted into each thimble and the fingers turned down upon the head previous to the thimble being screwed into the pipe.

The tubular platform-frame constructed in the before-described manner is very strong and stiff, and it can be easily taken apart for repairs or put together, and the clip-pieces and intermediate bearing-blocks have features in common, the simple forms being added to in order to adapt the respective parts to the particular places that they occupy in the car and the devices that are connected with them.

If the car is to be provided with sides, or with sides and roof, the following devices are added to the platform and its frame.

Fig. 10 is a side view, and Fig. 11 a plan, of the shoe-piece s, employed for the bolts s', that tie the wooden sides to the platform h'. These shoes are applied at the proper places beneath the sills and the upper tubes, a. The portion 18 is flat and adapted to pass below the sill h, and the portion 19 is curved to pass below the tube a. The bolt s', passing through the sill h and through the shoe s, is provided with a nut or head beneath the shoe. When there are sides—such as in a gondola-car, Fig. 2—the upper ends of the bolts will be flattened and screwed, riveted, or otherwise secured to the wood-work of the sides. When the bolt is used with an inclosed passenger or freight car, Fig. 1, the same will usually pass through the timbers and roof-plates. The shoe-pieces are unchanged.

The sides of the car are provided with posts or studs t' of wood. These are bolted to the sides of the pipes a by screw-clips t, the curved portions of which pass around the tubes in the form of straps, and the end screw portions are horizontal and pass through clamping-plates. Sometimes I use two of these clips to each post, as seen in Figs. 21 and 22, but usually only one, as in Figs. 23, 24, and 25. In this latter case the screw portions of the clip pass through the post, and through two plates, $u$ and $u'$, at the inner and outer sides, respectively, of the post, so as to clamp and hold such post very firmly. At the edges of the plates $u\,u'$ are notches, and there are vertical ribs 20 at the inner vertical edges. The plates $v\,v'$ are made with projections 21 that pass into the notches in the plates $u\,u'$, and the edges of said plates $v\,v'$ set behind the vertical ribs 20, so that the plates $v\,v'\,u\,u'$ are firmly interlocked at their edges and cannot be separated, except by taking off the outer plate, $u$, after removing the nuts of the clips t. These plates $u\,u'\,v\,v'$ form a box, for firmly holding the lower part of the post or stud, and it is usually preferable to apply the box at the top tube, a, and to allow the lower end of the stud or post to rest against the side of the lower tube. The back plate, $u'$, has flanges $u^2$ at its sides, extending backwardly, and of semicircular shape at their edges, as seen in Figs. 23 and 33, so as to take a proper bearing against the side of the upper tube. The plates $u\,u'\,v\,v'$ are shown separately in Figs. 28, 29, 30, and 31. Where a diagonal tie-bolt, w, is required for the upper part of the car, the same is formed with an eye at the lower end, and there is a hook, $v^2$, cast upon the plate v, over which the eye is passed, as seen in Figs. 1, 23, 24, 25, 28, and 29; and where a wooden brace, $w^2$, is used, the plate $v'$ has a rest or triangular socket, $v^3$, at the side thereof, to receive the lower end of the brace. (See Figs. 1, 24, 25, 31, 32.)

The upper portions of the car that are made of wood may be of any desired construction, and do not require further description.

By the foregoing the mode of connecting the upper works to the metal platform-frame will be understood.

I remark that the door K, which in freight cars is usually suspended from a track at the upper part of the car, has to be held by a door-stop at the bottom, to prevent it swinging outwardly. I make this stop of metal, as seen at 30, Fig. 35. It has a hook-shaped end that comes up outside the lower edge of the door, and it sets against the side of the upper tube, *a*, and there is a strap-shaped projection running back over said pipe *a* and bolted to the top of the sill *h*, and a vertical bolt, 31, passes through this door-stop, through the flooring near its edge, and through a piece of iron, 32, that is applied to the edge of the flooring at the doorway, so as to make a firm connection and to protect the flooring. There may be one or two of these stops to each door.

I claim as my invention—

1. The combination, with the longitudinal tubes *a a*, of intermediate bearing-blocks between such tubes, clips passing around the tubes, and bolts passing through the bearing-blocks and the clips, substantially as set forth.

2. The combination, with the longitudinal tubes, of intermediate bearing-blocks, clips passing around the tubes, struts below the lower clips, and tie bars or braces connected to the lower ends of the struts, substantially as set forth.

3. The combination, with the longitudinal tubes, clips, bearing-blocks, and struts, of T-shaped bars connecting the lower ends of the struts, and longitudinal truss-bolts, substantially as specified.

4. The combination, with the longitudinal tubes, clips, and bearing-blocks, of struts that are inclined, tie-bars connecting the lower ends of the inclined struts, and longitudinal truss-bolts passing below the tie-bars and at the sides of the longitudinal tubes, substantially as specified.

5. The combination, with the longitudinal tubes, of clips and divided intermediate bearing-blocks, bolts to connect the same, and bolts passing through the divided bearing-bars, substantially as set forth.

6. The combination, with the longitudinal tubes and clips, of divided bearing-blocks, bolts connecting the clips and bearing-blocks, and bolts passing between the divided bearing-blocks, substantially as set forth.

7. The combination, with the longitudinal tubes and clips, of intermediate bearing-blocks, a transom-beam, and bolts for connecting the respective parts, substantially as set forth.

8. The combination, with the longitudinal tubes, of the clips, the intermediate bearing-blocks, the saddle having eyes at the end portions, and the diagonal braces passing through the eyes, substantially as set forth.

9. The combination, with the longitudinal tubes and clips and bearing-blocks to connect the tubes together, of clips passing around the tubes, vertical stanchions and clamping-plates for the same, substantially as set forth.

10. The stanchion, the clips and plates, the longitudinal tubes, and the socket or rest for the braces, substantially as set forth.

11. The stanchion, the clip, and plates for the same, and a hook upon the side plate, and a tie-brace having an eye for the said hook, substantially as set forth.

12. The combination, with the longitudinal tubes, of the end bearing-pieces, the connecting-bolts, and the end sill of the flanged iron, substantially as set forth.

13. The shoe-piece *s* and bolt *s'*, in combination with the longitudinal tubes, and the longitudinal sill-pieces, substantially as specified.

14. In combination with the longitudinal tubes, of plugs passing into the tubes, bolts through such plugs, and ears to hold the head of the bolt, substantially as set forth.

15. The thimble *o*, having a polygonal head, in combination with the tube *a* and end socket, substantially as set forth.

16. The bearing-blocks having recessed ends and shoulders 7, for the purposes set forth.

17. The clips *b*, adapted to set over the tube *a*, and having shoulders at 6, adapted to interlock with the bearing-blocks, substantially as set forth.

18. The clips adapted to set against the tube *a*, and provided with the struts *d*, substantially as set forth.

19. The plates *v*, adapted to set against the tube and to receive the plates *u u'*, substantially as set forth.

20. The plates *u u'* and *v v'*, having notches, projections, and ribs, substantially as specified, so as to interlock when set together.

21. The thimble *o*, adapted to receive the bolt *r*, and having a polygonal head, substantially as set forth.

22. The shoe *s*, having a flat portion to set against the sill, and a concave portion to rest against the tube, substantially as set forth.

23. The saddle *n*, adapted to rest against the bearing-block, and having the openings for the bolts, substantially as set forth.

24. The door-stop formed as a hook at one end and adapted to set against the longitudinal tube, and provided with holes for the bolts, as specified.

Signed by me this 28th day of February, A. D. 1884.

JAMES THORN GOODFELLOW.

Witnesses:
GEO. T. PINCKNEY,
WILLIAM G. MOTT.